United States Patent
Shim

(10) Patent No.: US 9,402,183 B2
(45) Date of Patent: Jul. 26, 2016

(54) MOBILE TERMINAL AND METHOD FOR CONTROLLING THE SAME

(71) Applicant: LG ELECTRONICS INC., Seoul (KR)

(72) Inventor: Hongjo Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/657,830

(22) Filed: Mar. 13, 2015

(65) Prior Publication Data

US 2016/0007194 A1 Jan. 7, 2016

(30) Foreign Application Priority Data

Jul. 2, 2014 (KR) .................. 10-2014-0082634

(51) Int. Cl.
*H04M 1/66* (2006.01)
*H04W 12/06* (2009.01)
*H04W 12/08* (2009.01)

(52) U.S. Cl.
CPC .............. *H04W 12/06* (2013.01); *H04W 12/08* (2013.01)

(58) Field of Classification Search
CPC ............................... H04W 12/06; H04W 12/08

USPC .................... 455/411, 446.1, 456.1
See application file for complete search history.

(56) References Cited

U.S. PATENT DOCUMENTS

2014/0143859 A1    5/2014  Linge et al.
2015/0012886 A1*   1/2015  Lu ........................ G06F 3/0488
                                                              715/835

FOREIGN PATENT DOCUMENTS

| KR | 10-2009-0070489 A | 7/2009 |
|----|-------------------|--------|
| KR | 10-2013-0117371 A | 10/2013 |
| KR | 10-1404234 B1 | 6/2014 |
| WO | WO 2013/000150 A1 | 1/2013 |

* cited by examiner

*Primary Examiner* — Dhaval Patel
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to enter the mobile terminal into a lock state, receive a touch pattern formed by a plurality of taps applied on the touch screen, and release the lock state of the mobile terminal when the touch pattern formed by the taps matches defined positions of the taps and time intervals between the taps.

17 Claims, 12 Drawing Sheets

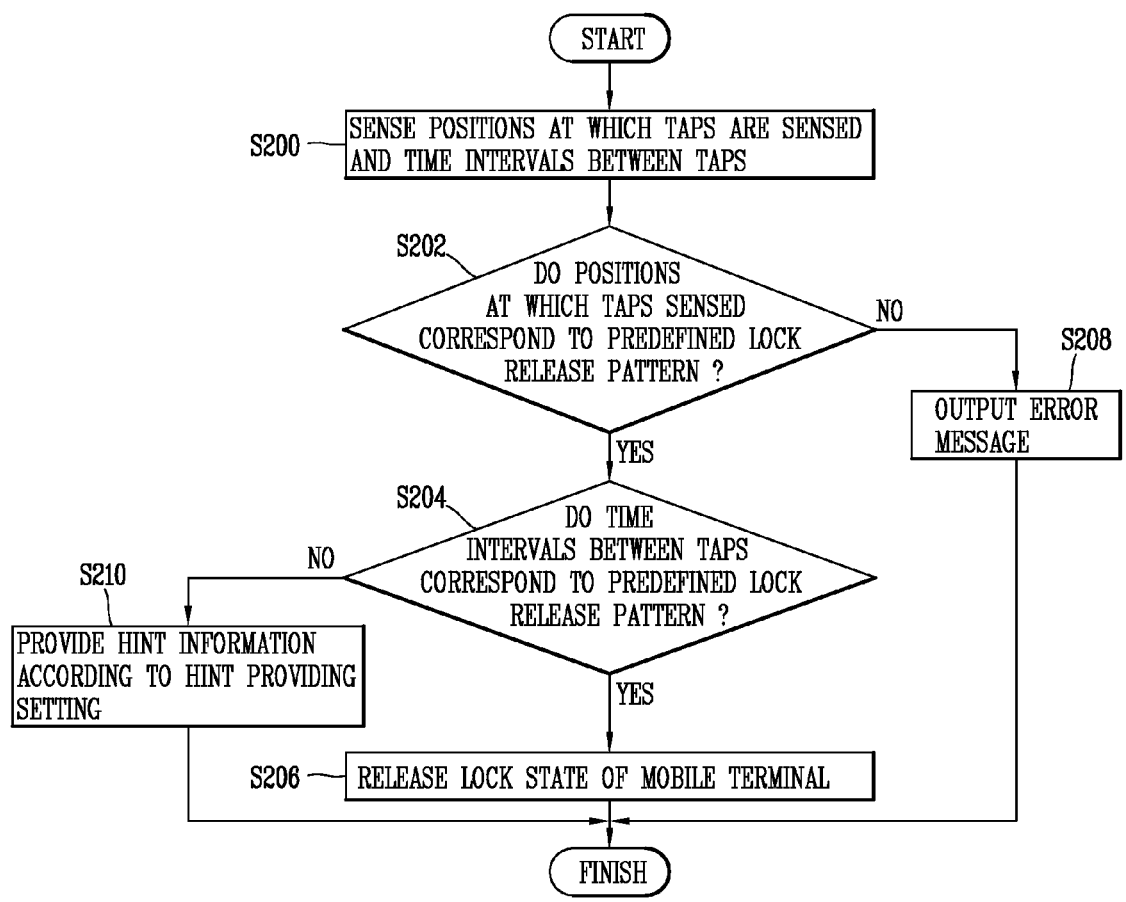

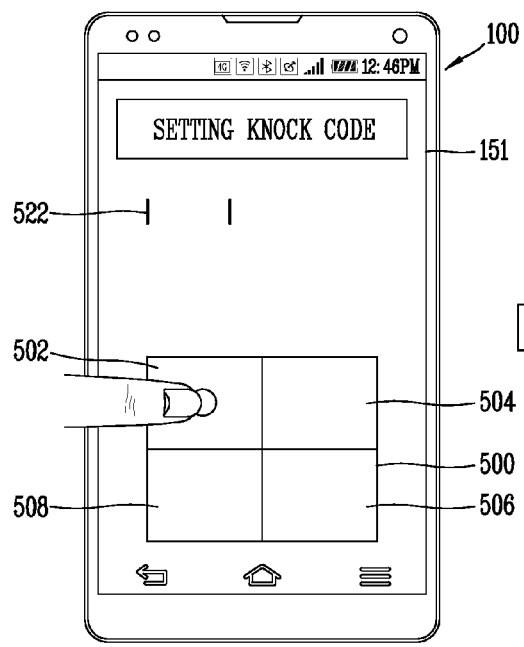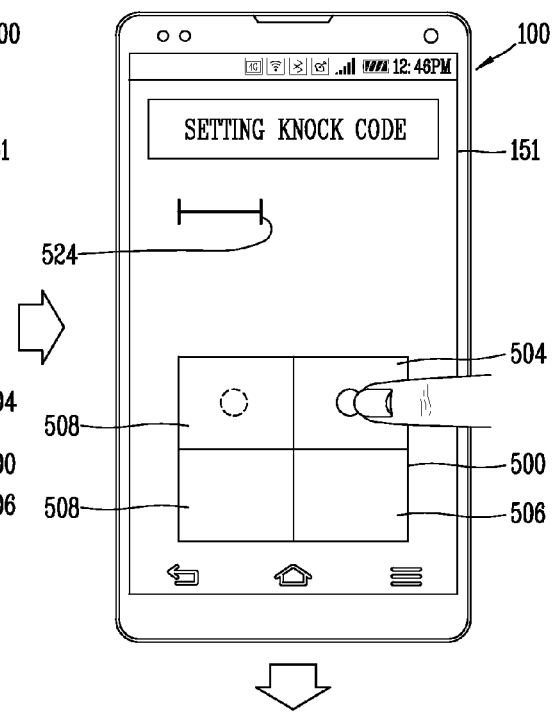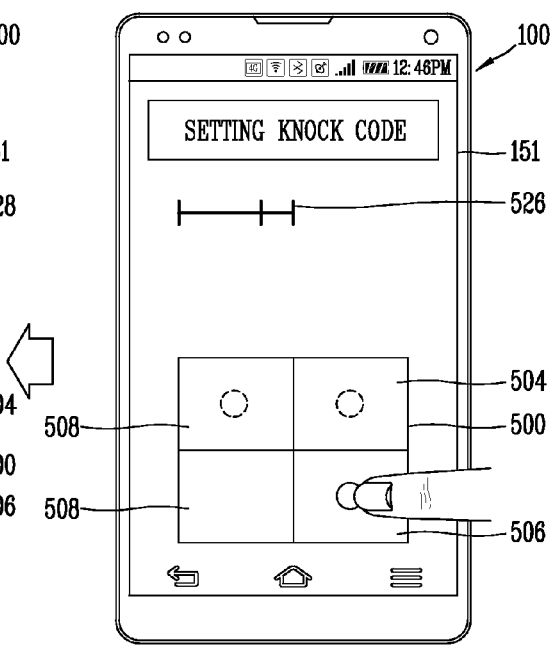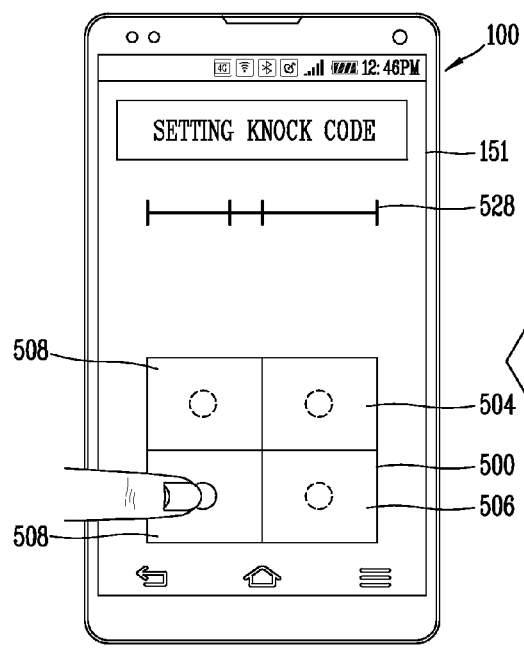

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2014-0082634, filed on Jul. 2, 2014, the contents of which is incorporated by reference herein in its entirety.

BACKGROUND OF THE INVENTION

1. Field of the Invention

The present invention relates to a mobile terminal and a method for controlling the same, in which a function of the mobile terminal can be controlled only by tapping a main body of the mobile terminal.

2. Description of the Related Art

A terminal is broadly categorized by mobility into a mobile terminal and a stationary terminal. The mobile terminal is further categorized into a handheld terminal and a vehicle-mounted terminal. In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

However, the interface for operating the terminal has become complex and is often difficult and cumbersome to operate.

SUMMARY OF THE INVENTION

Therefore, an aspect of the detailed description is to provide a mobile terminal and a method for controlling the same, which can provide a more powerful security function when a plurality of taps are applied to a main body of the mobile terminal in order to control a function of the mobile terminal.

Another aspect of the detailed description to provide a mobile terminal and a method for controlling the same, which can provide a user with interest when a plurality of taps are applied to a main body of the mobile terminal in order to control a function of the mobile terminal.

To achieve these and other advantages and in accordance with the purpose of this specification, as embodied and broadly described herein, a mobile terminal includes: a main body; a display unit disposed at a front surface of the main body; a sensing unit configured to sense a plurality of taps applied on the display unit; and a controller configured to release a lock state in which the reception of a control command is limited based on a touch pattern formed by the plurality of taps, wherein the touch pattern is defined by positions at which the taps are sensed and time intervals between the sensed taps.

To achieve these and other advantages and in accordance with the purpose of this specification, as embodied and broadly described herein, the present invention provides in another aspect a method for controlling a mobile terminal, the method including sensing a plurality of taps applied on a display unit formed in a main body of the mobile terminal; and releasing a lock state in which the reception of a control command, based on a touch pattern formed by the plurality of taps, wherein the touch pattern is defined by positions at which the taps are sensed and time intervals between the sensed taps.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate embodiments and together with the description serve to explain the principles of the invention.

In the drawings:

FIG. 2 is a flowchart illustrating an operation process of the mobile terminal according to an embodiment;

DETAILED DESCRIPTION OF EMBODIMENTS

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

Figure 1A:
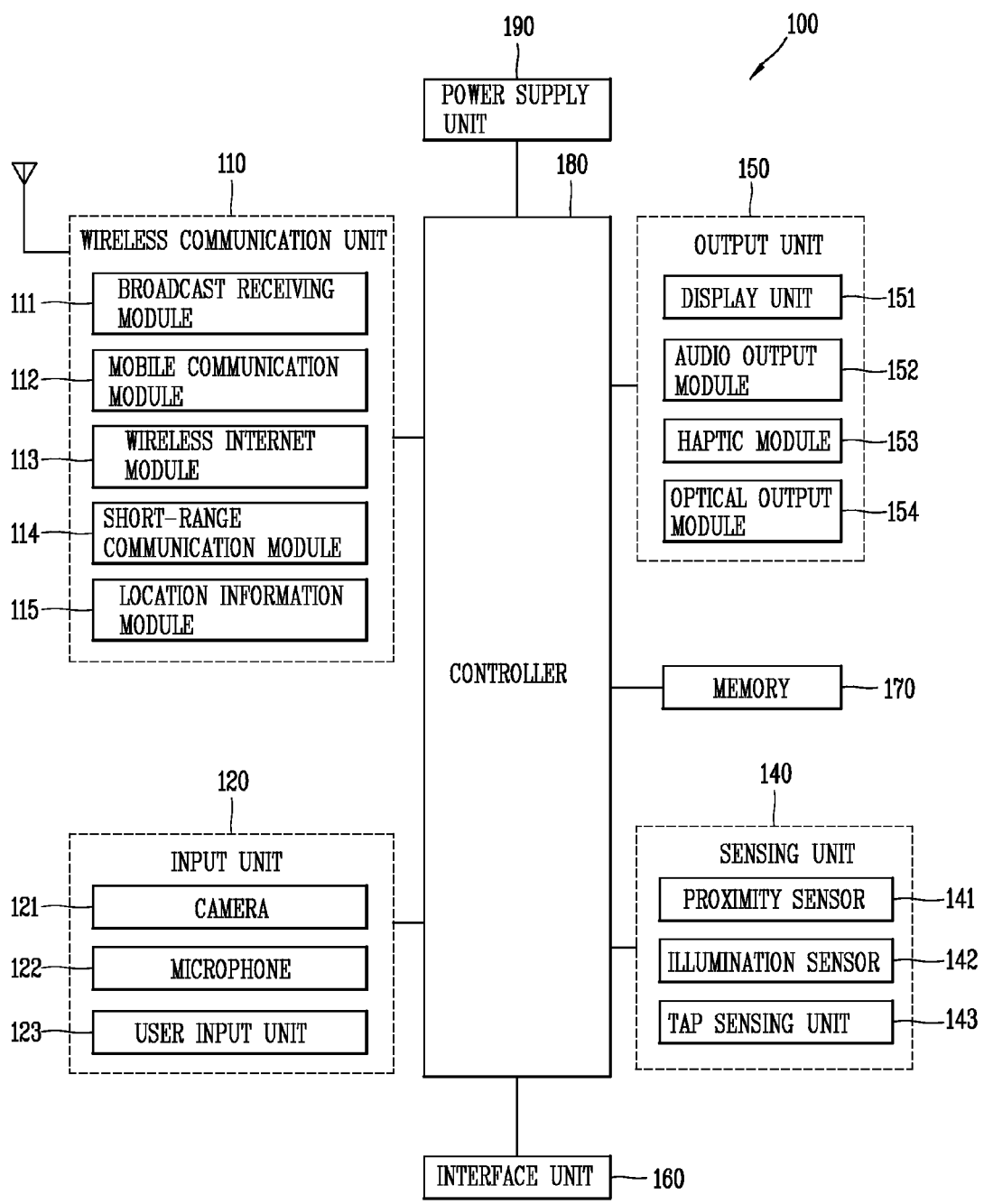
FIG. 1A is a block diagram illustrating a mobile terminal according to an embodiment.
Figure 1B:
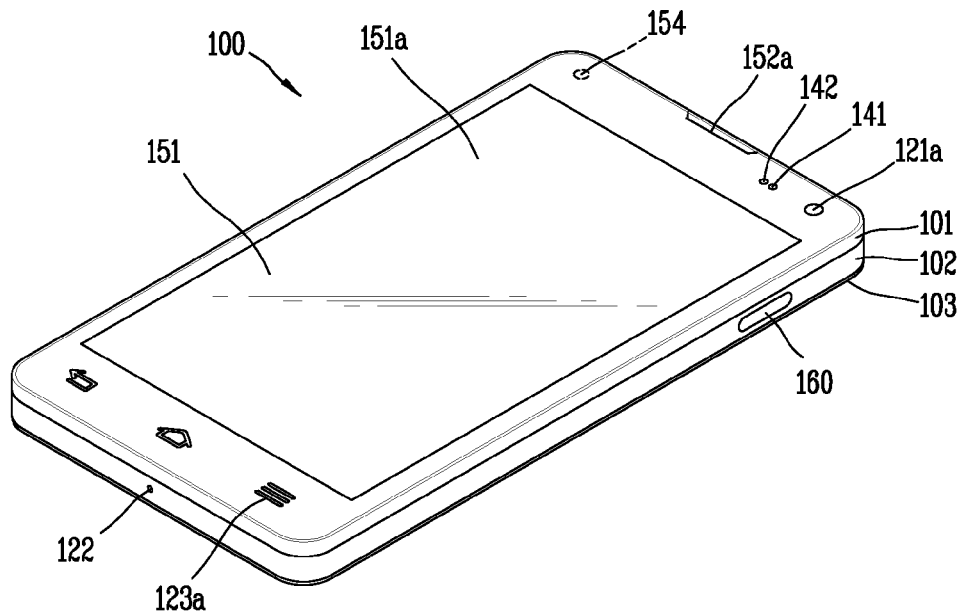
FIGS. 1B and 1C are conceptual views illustrating an example of the mobile terminal viewed in different directions according to the embodiment.
Figure 1C:
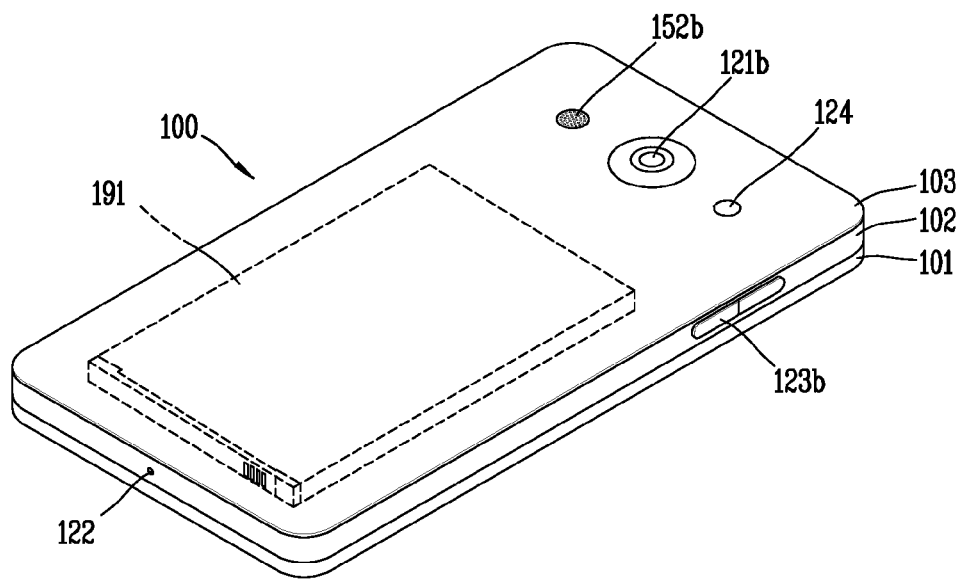

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with one another in order to implement an operation, control or control method of the mobile terminal according to various embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1A, before various embodiments are explained. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

In addition, the sensing unit 140 of the mobile terminal 100 according to an embodiment of the present invention may further include a tap sensing unit 143 configured to sense a tap indicating that a user hits a main body or the display unit 151 or a tap gesture and a state sensing unit configured to sense an operation state and an environmental state of the mobile terminal 100.

The tap sensing unit 143 can sense a gesture of hitting the main body or the display unit 151 of the mobile terminal 100 or an article. More specifically, the tap may be understood as an operation of lightly hitting the main body and the display unit 151 of the mobile terminal 100 or the article with a tap object such as a finger or an operation of bring the tap object into contact with the main body and the display unit 151 of the mobile terminal 100 or the article.

The tab object for applying the tap may be a thing capable of applying external force to the main body and the display unit 151 the mobile terminal 100 or the article, which includes, for example, a finger, a stylus pen, a pen, a pointer, a blow, and the like. The tap object is not limited to the thing capable of applying a touch input to the mobile terminal 100 according to an embodiment of the preset invention, but may include various types of things capable of applying an external force to the main body and the display unit 151 of the mobile terminal 100 or the article.

The article to which the tap gesture is applied may include at least one of the main body of the mobile terminal 100 and the article on which the mobile terminal 100 is positioned. In an embodiment of the present invention, the tap or tap gesture may be sensed by at least one of an acceleration sensor and a touch sensor which are included in the tap sensing unit 143. Here, the acceleration sensor can measure acceleration of the main body of the mobile terminal 100 or dynamic forces, such as vibration, impact, and the like, applied to the main body and the display unit 151.

That is, the acceleration sensor may sense movement (or vibration) of the main body of the mobile terminal 100 that is caused by the tap gesture to determine whether the tap has been applied to the article. Accordingly, the acceleration sensor may sense a tap applied to the main body of the mobile terminal 100 or sense a tap applied to the article that is positioned so closely to the main body of the mobile terminal 100 to sense whether movement or vibration has occurred in the main body of the mobile terminal 100.

As such, the acceleration sensor can sense a tap applied to a point that is positioned away from the main body in addition to the main body of the mobile terminal as long as the acceleration sensor can sense the movement or vibration in the main body of the mobile terminal 100.

The mobile terminal according to an embodiment of the present invention may use only one of the acceleration sensor and the touch sensor, sequentially use the acceleration sensor and the touch sensor, or simultaneously use the acceleration sensor and the touch sensor in order to sense a tap applied to the main body or the display unit 151 of the mobile terminal 100. To sense a tap, a mode using only the acceleration sensor may be referred to as a first mode, a mode using the touch sensor may be referred to as a second mode, a mode using both of the acceleration sensor and the touch sensor (simultaneously or sequentially) may be referred to as a third mode or hybrid mode.

When a tap is sensed through the touch sensor, a position in which the tap is sensed may be found more accurately. The mobile terminal according to an embodiment of the present invention may operate in a specific mode in which minimum electric current or power is consumed even when the display unit 151 of the mobile terminal 100 is in an activated state in order to sense the tap through the acceleration sensor or touch sensor. The specific mode is referred to as a doze mode.

For example, the doze mode may be a mode in which only a light emitting device for outputting a screen to the display unit 151 is turned off, and the touch sensor may be maintained in an on-state, in a touch screen structure in which the touch sensor and the display unit 151 form a mutual layer structure. Alternatively, the doze mode may be a mode in which the display unit 151 is turned off and the acceleration sensor is maintained in an on-state. Alternatively, the doze mode may be a mode in which the display unit 151 is turned off and both of the touch sensor and the acceleration sensor are maintained in an on-state.

Accordingly, in the doze mode, that is, when a lighting device of the display unit 151 is turned off or the display unit 151 is turned off (i.e., the display unit 151 is inactivated), and when a user applies the tap to at least one point on the display unit 151 or a specific point of the main body of the mobile terminal 100, at least one of the touch sensor and the acceleration sensor, which is turned on, can sense that the tap has been applied by the user.

In addition, the tap sensing unit 143 can determine that "tap" for controlling the mobile terminal 100 has been sensed only when two or more taps are applied in a reference time. For example, when one tap is applied to the display unit 151 by the touch object, the tap sensing unit 143 can recognize the one tap as a touch input. That is, in this instance, the controller 180 can control a function (for example, a function of selecting an icon output at a point where the touch input is applied) according to a touch input corresponding to the one tap rather than a function corresponding to the one tap.

Accordingly, the controller 180 can determine whether "tap" for controlling one or more functions has been sensed only when two or more (or a plurality of) consecutive taps are sensed by the tap sensing unit 143 in a reference time. That is, the tap gestures may mean that the tap gesture is sensed twice or more consecutively in the reference time. Accordingly, the phrase "tap has been sensed" used herein may mean that it has been sensed that the main body or the display unit 151 of the mobile terminal 100 is tapped substantially two or more times with an object such as a user's finger or touch pen.

Furthermore, the controller 180 can determine whether the taps are applied with the same or different fingers of the user in addition to whether the taps are sensed in the reference time. For example, when the taps are sensed on the display unit 151, the controller 180 can sense whether the taps are applied with one or different fingers by utilizing fingerprints that are sensed at points where the taps are applied. Alternatively, the controller 180 can sense whether the taps are applied with one or different fingers by recognizing positions in which the taps are sensed on the display unit 151 or accelerations which are caused by the taps through at least one of the touch sensor and acceleration sensor that are included in the tap sensing unit 143.

Furthermore, the controller 180 can sense whether the taps are applied with one hand or finger or both hands or at least two fingers by the user in further consideration of angles and distances at which the taps are applied or directions in which the fingerprints are recognized. The taps may mean a plurality of hits that are sensed consecutively in a reference time. Here, the reference time may be a very short time, for example 300 ms to 2 sec.

Further, when the tap sensing unit 143 senses that the main body or the display unit 151 of the mobile terminal 100 is first hit, the tap sensing unit 143 can sense a presence of a subsequent hit in a reference time after the first hit is sensed. Then, when the subsequent hit is sensed in the reference time, the tap sensing unit 143 or the control unit 108 may determine that a tap for controlling a specific function of the mobile terminal 100 has been sensed according to an embodiment of the present invention. As such, the controller 180 can determine whether the tap has been applied by the user to control the mobile terminal 100 or just by mistake by recognizing the tap as an effective tap only when a second tap is sensed in a predetermined time after the first tap is sensed.

In addition, there may be various methods for recognizing the effective tap. For example, the controller 180 can recognize, as the effective tap, a second tap indicating that the main body or display unit 151 is hit a second reference number or more of times in a predetermined time after a first tap indicating that the main body or display unit 151 is hit a first reference number or more of times is sensed. Here, the first reference number may be the same as or different from the second reference number. For example, the first reference number may be one, and the second reference number may be two. Alternatively, the first reference number may be one, and also the second reference number may be one.

In addition, the controller 180 can determine that a "tap" have been sensed only when the tap is applied to a "predetermined region." That is, when a first hit is sensed on the main body or display unit 151 of the mobile terminal 100, the controller 180 can calculate a predetermined region away from a point in which the first hit has been sensed. Then, when the "predetermined region" is hit the first or second reference number or more of times within the reference time from a time when the first hit is sensed, the controller 180 can determine the first tap or the second tap is applied.

The above described reference time and predetermined region may be varied depending on the embodiment of the present invention. Each of the first tap and the second tap may be sensed as a separate tap depending on a position in which each tap has been sensed in addition to the reference time and the predetermined region. That is, the controller 180 can determined that the first tap and the second tap are applied when the second tap is sensed at a position spaced a certain distance from a position in which the first tap is sensed. As such, when the first tap and the second tap are recognized based on the sensed position, the first tap and the second tap may be sensed at the same time.

In addition, when the first tap and the second tap include a plurality of touches, that is, a plurality of taps, the plurality of touches included in each of the first tap and the second tap may also be sensed at the same time. For example, while a first touch included in the first tap is sensed and at substantially the same time, a first touch included in the second tap is sensed at a position spaced a certain distance from a position in which the first touch of the first tap is sensed, the controller 180 can sense the first touches included in the first tap and the second tap. When an additional touch input is sensed at each position and then the touch is sensed at each position the first reference number or the second reference number or more of times, the controller 180 can determine that the first tap and the second tap are applied.

When a tap is sensed on the main body or the display unit 151 of the mobile terminal 100 by the tap sensing unit 143 multiple times, the controller 180 can control at least one of functions executable by the mobile terminal based on the tap that is sensed multiple times.

For example, the controller 180 can control at least one of functions executable on the mobile terminal when the tap sensed multiple times satisfies a predetermined condition. As an example, the controller 180 can control different functions depending on whether the user applies the plurality of taps using only one finger or hand or at least two fingers or both hands. Furthermore, the controller 180 can control at least one of functions executable by the mobile terminal 100 according to the plurality of taps based on the current operation state of the mobile terminal 100 and the environmental state of the mobile terminal 100.

Here, the functions executable on the mobile terminal 100 may mean all kinds of functions that can be executed or driven by the mobile terminal 100. For example, one of the executable functions may be an application installed by the mobile terminal 100. For example, the phrase "execute any function" may mean that any application is executed or driven in the mobile terminal 100.

As another example, the function executable by the mobile terminal 100 may be a function that is needed to basically drive the mobile terminal 100. For example, the basic driving function may include a function of turning on/off a lighting device included in the display unit 151, a function of switching the mobile terminal 100 from an unlock state to a lock state or from the lock state to the unlock state, a function of setting a communication network, and a function of changing setting information of the mobile terminal 100.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card.

Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Meanwhile, the controller 180 of the mobile terminal 100 according to the embodiment may further consider not only positions at which plurality of taps applied to the main body or the display unit 151 are sensed but also time intervals between the sensed taps. That is, in the mobile terminal 100 according to the embodiment, if a plurality of taps are applied to the main body or the display unit 151, the controller 180 decides whether the positions at which the taps are sensed and the time intervals between the sensed taps correspond to a predefined touch pattern, and accordingly, enables a specific function of the mobile terminal 100 to be controlled.

Here, the time intervals between the taps may mean time intervals between taps decided as valid taps. In this instance, when a tap (first tap) decided as a valid tap is sensed, the controller 180 can check a time until another tap (second tap) decided as a valid tap is sensed from the time when the first tap was sensed, and decide the checked time as a time interval between the first and second taps. When predetermined taps are sensed, the controller 180 can allow a specific function of the mobile terminal 100 to be controlled according to whether the time intervals between the sensed taps correspond to a predefined touch pattern.

Alternatively, the time interval between the taps may become a time when the state in which a user applies a specific tap is maintained. For example, when the user applies the second tap after maintaining a state in which the first tap is applied for a predetermined time or more, the controller 180 can decide the time when the state in which the first tap is applied is maintained as the time interval between the first and second taps. In this instance, when predetermined taps are sensed, the controller 180 can allow a function of the mobile terminal 100 to be controlled according to whether the time intervals between the sensed taps correspond to a predefined touch pattern.

Meanwhile, the specific function may be a function of simply releasing a lock state of the mobile terminal 100, or may be a function of executing a specific application and entering into an operation state in which a screen related to the executed application is displayed on the display unit 151. Here, the lock state means a state in which at least one of functions available in the mobile terminal 100 according to the embodiment is limited. For example, the lock state may mean a state in which the reception of a control command is limited by the user.

Meanwhile, the controller 180 of the mobile terminal 100 according to the embodiment may provide various functions related to a touch pattern formed by positions at which taps are sensed and time intervals between the sensed taps. For example, when the user applies a plurality of taps to the main body or the display unit 151, the controller 180 can decide whether the user inputs a right touch pattern based on a time interval between the applied taps as a result obtained by sensing the plurality of taps. Also, the controller 180 can display an error message related to whether the user inputs a right touch pattern based on the decision result. In this instance, the controller 180 can provide the user with information related to the time intervals between the taps as predetermined 'hint' information according to a user's selection.

Meanwhile, the touch pattern may be variously defined. Here, the touch pattern may be defined based on positions of taps applied to the main body or the display unit 151 of the mobile terminal 100 and time intervals between the taps. Therefore, the touch pattern may be defined as different touch patterns according to the time intervals between the taps even though the positions of the taps are the same. On the contrary, the touch pattern may be defined as different touch patterns according to the positions of the taps even though the time intervals between the taps are the same. In this instance, it will be apparent that the different touch patterns may be set to correspond to different functions of the mobile terminal 100.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A method of controlling the mobile terminal with the configuration described above according to embodiments of the present invention is described below referring to the accompanying drawings. It is apparent to a person of ordinary skill in the art that modification, alteration, and improvement can be made to the present invention within a scope that does not depart from the nature and gist of the present invention.

Meanwhile, in the above description, various touch patterns may be defined based on positions at which a plurality of taps are sensed and time intervals between the sensed taps, and the touch patterns are used to control different functions executable in the mobile terminal. However, in the following description, the function of releasing the lock state of the mobile terminal will be described as an example of the function of the mobile terminal, controlled by the touch pattern. Accordingly, a predefined touch pattern in the following description is previously set to release the lock state of the mobile terminal. Thus, the predefined touch pattern will be referred to as a lock release pattern. However, the present invention is not limited thereto, and another function may be applied without limit.

FIG. 2 illustrates an operation process of the mobile terminal according to an embodiment. Referring to FIG. 2, when a plurality of taps are sensed on the display unit 151, the controller 180 of the mobile terminal 100 according to the embodiment senses positions at which the taps are sensed and time intervals between the taps (S200). Here, the time interval, as described above, may mean a time interval until another tap (second tap) is applied after any one (first tap) of the plurality of taps is applied. Alternatively, the time interval may mean a time when the state in which the first tap is applied is maintained until the second tap is applied after the first tap is applied.

Meanwhile, in step S200, when the plurality of taps are sensed, the controller 180 can display, on the display unit 151, graphic objects respectively corresponding to the time intervals between the plurality of taps, so that a user can visually identify the time intervals between the taps. The graphic objects may be displayed in various shapes including a figure of which size is determined according to the time intervals between the taps, a bar of which length is determined according to the time intervals, and the like.

Alternatively, the controller 180 can display the time intervals using a vibration or a light emitting diode (LED) formed in the main body of the mobile terminal 100, without displaying the time intervals as image information displayed on the display unit 151. When the vibration or the LED is used as described above, the controller 180 can allow the user to recognize the time intervals based on the intensity or strength of vibration or light generated from the haptic module 153 or the LED.

Meanwhile, if the time intervals are displayed through the vibration or the LED when the display unit 151 is in a non-activated state, the controller 180 can maintain the non-activated state of the display unit 151 as it is. In addition, if the positions at which the taps are sensed and the time intervals between the taps are sensed in step S200, the controller 180 decides whether the positions at which the taps are sensed correspond to a predefined lock release pattern (S202). If it is decided in step S202 that the positions at which the taps are sensed do not correspond to the predefined lock release pattern, the controller 180 can decide that the plurality of taps are not used to release a lock state of the mobile terminal 100.

In this instance, the controller 180 cannot give any response to the plurality of taps. This is because as the lock state is a state in which the reception of a user's control command is limited as described above, any control command may not be received during the lock state. In this instance, the controller 180 can identify whether a predetermined time elapses. When the predetermined time elapses, the controller 180 can receive a plurality of taps for releasing the lock state, applied from the user.

However, in this instance, the user may not recognize whether the user exactly input the plurality of taps. Therefore, when the positions at which the plurality of taps are applied do not correspond to the predefined lock release pattern even though the state of the mobile terminal 100 is in the lock state as described above, the controller 180 can display an error message for notifying this on the display unit 151 or may notify the user of this using a voice message or the like (S208). In addition, the controller 180 can again receive a plurality of taps for releasing the lock state of the mobile terminal 100, applied from the user.

Meanwhile, if it is decided in step S202 that the positions at which the taps are sensed correspond to the predefined lock release pattern, the controller 180 can compare the predefined lock release pattern with the time intervals between the taps (S204). If it is decided in step S204 that the time intervals between the taps correspond to the predetermined lock release pattern, the controller 180 can release the lock state of the mobile terminal 100 (S206).

However, if the time intervals between taps do not correspond to the predefined lock release pattern as the comparison result of step S204, the controller 180 can provide the user with information (hint information) related to the time intervals between the taps defined in the predefined lock release pattern, according to a predetermined hint providing setting (S210).

In addition, the hint information may be provided in various forms. For example, the hint information may be a predetermined sound source data. Alternatively, the hint information may be predetermined times having different lengths or predetermined vibrations having different strengths. Alternatively, the hint information may be light of an LED flickered at on/off time intervals having different lengths. The providing of the hint information may be selected by the user, and the form of the provided hint information may also be selected by the user.

Accordingly, if only the time intervals between the taps do not correspond to the lock release pattern, the controller 180 provides the user with the hint information, to enable the user to exactly apply a plurality of taps for the lock release pattern according to a rhythm corresponding to the lock release pattern, i.e., the time intervals between the taps defined in the lock release pattern. Accordingly, although the user forgets the time intervals between the plurality of taps, i.e., the rhythm where the plurality of taps are applied, the user can remember the rhythm using the hint information.

Meanwhile, as described above, the controller 180 decides whether the positions at which a plurality of taps are applied to the display unit 151 of the mobile terminal 100 correspond to the predefined lock release pattern. In addition, the controller 180 decides whether the plurality of taps correspond to the predefined lock release pattern by further considering the rhythm where the user applies the plurality of taps, i.e., the time intervals between the plurality taps when the user applies the taps. Accordingly, in the present invention, it is possible to obtain security remarkably superior to that when the positions are simply considered.

The hint information, as described above, may be provided the user when the positions at which a plurality of taps are applied to the display unit 151 of the mobile terminal 100 first correspond to the predefined lock release pattern. Therefore, as shown in step S202, when the positions at which the plurality of taps are applied do not correspond to the predefined lock release pattern, the hint information may not be displayed. Accordingly, in the present invention, the hint information is provided only to a user who knows positions corresponding to the predefined lock release pattern, so that it is possible to prevent the hint information from being exposed to another person.

Figure 3A:
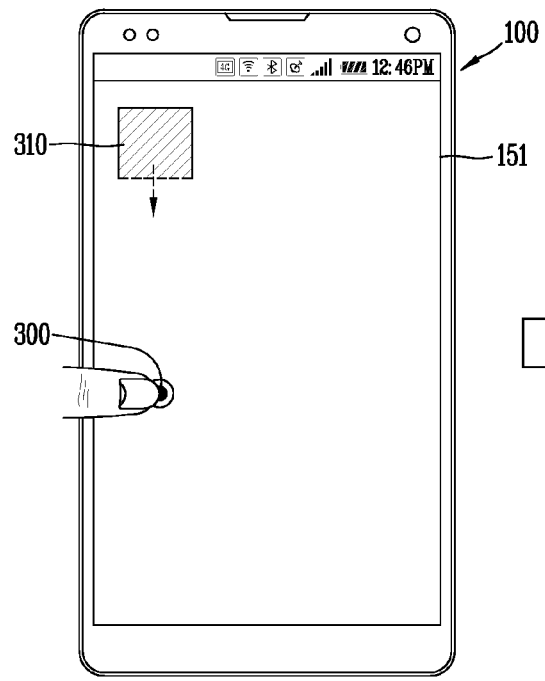
FIG. 3A(a) to FIG. 3A(d) are views illustrating an example in which time intervals between a plurality of taps input by a user are displayed in the mobile terminal according to an embodiment.
Figure 3A:
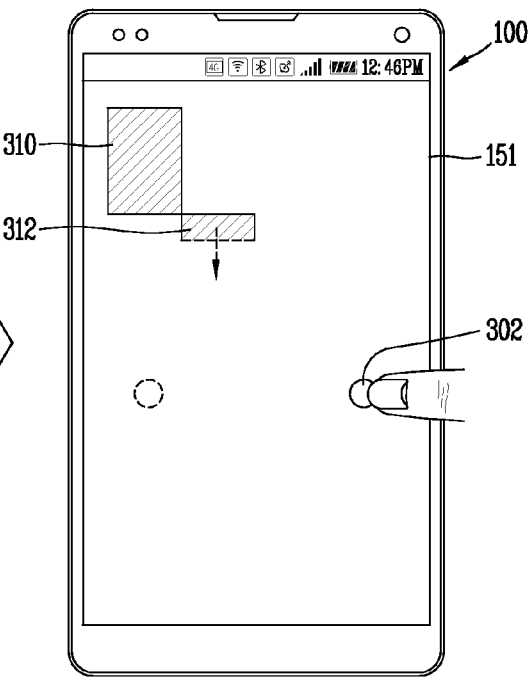
Figure 3A:
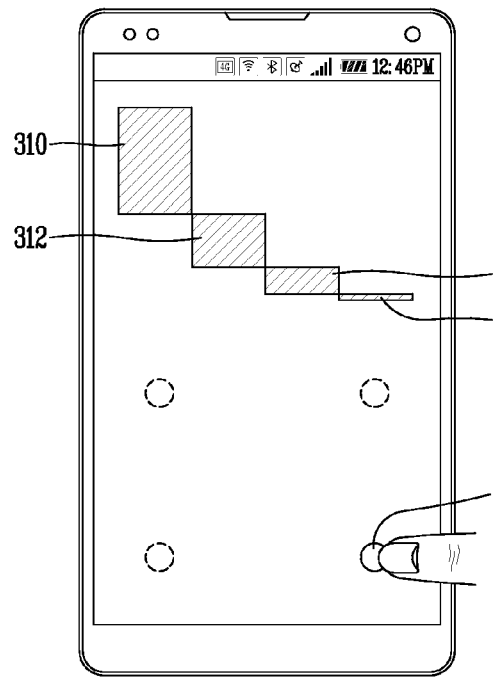
Figure 3A:
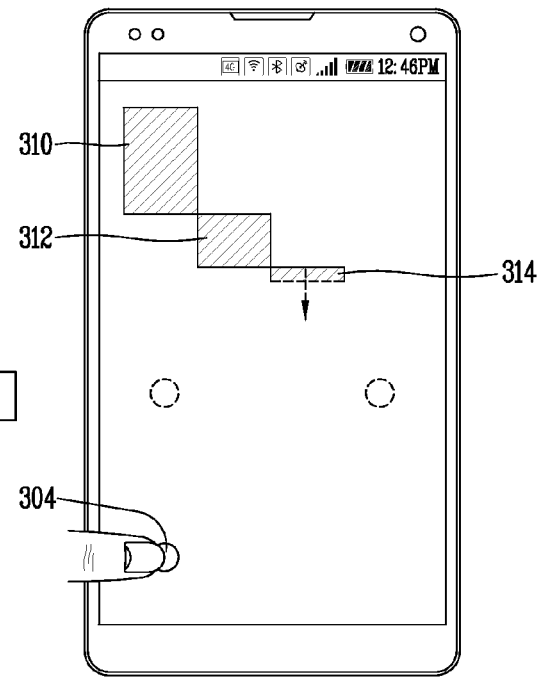

FIG. 3A(a) to FIG. 3A(d) are views illustrating an example in which time intervals between a plurality of taps input by a user are displayed in the mobile terminal according to an embodiment. When a plurality of taps are applied to the display unit 151, the controller 180 of the mobile terminal 100 according to the embodiment checks not only positions at which the taps are sensed but also time intervals between the taps. In addition, the controller 180 can display graphic objects respectively corresponding to the time intervals between the taps on the display unit 151 so that the user can identify the time intervals between the taps with the user's eyes.

FIG. 3A(a) to FIG. 3A(d) illustrate examples of the graphic objects displayed on the display unit 151 of the mobile terminal 100 according to the embodiment. First, referring to FIG. 3A (a), when a first tap 300 is sensed at one point on the display unit 151, the controller 180 can display, on the display unit 151, a first graphic object 310 for displaying a time interval until a next tap is sensed after the first tap 300 is applied. In this instance, the first graphic object 310 may be displayed at a point of time when the first tap 300 is sensed, and the size of the graphic object 310 may gradually increase as shown in FIG. 3A(a).

When the user applies a second tap 302 subsequent to the first tap 300 to the display unit 151, the controller 180, as shown in FIG. 3A (b), may display, on the display unit 151, a second graphic object 312 corresponding to the second tap 302. When the second tap 302 is sensed as described above, the controller 180 can stop increasing the size of the first graphic object 310. This is because the first graphic object 310, as described above, is used to display a time interval between the first and second taps 300 and 302 to the user. That is, the size of the first graphic object 310 may increase until the second tap 302 is sensed after the first tap 300 is sensed. Accordingly, the user can recognize, from the size of the first graphic object 310, the time taken until the second tap 302 is applied after the first tap 300 is applied.

Similarly, time intervals between third and fourth taps 304 and 306 applied subsequent to the second tap 302 may also be respectively displayed through third and fourth graphic objects 314 and 316. That is, when the third tap 304 is additionally sensed as shown in FIG. 3A (c), the controller 180 can stop increasing the size of the second graphic object 312, and display, on the display unit 151, the third graphic object 314 corresponding to the third tap 304. The controller 180 can allow the size of the third graphic object 314 to increase until the fourth tap 306 is sensed from the user. When the fourth tap 306 is sensed, the controller 180 can allow the size of the third graphic object 314 to be determined by stopping that the size of the third graphic object 314 increases. The controller 180 can display, on the display unit 151, the fourth graphic object 316 corresponding to the fourth tap 406.

Meanwhile, the fourth tap 306 may be the last tap defined in a predetermined lock release pattern. In this instance, if the fourth tap 306 is sensed as shown in FIG. 3A (d), the controller 180 can stop increasing the size of the third graphic object 314 and simultaneously determine the size of the fourth graphic object 316 corresponding to the fourth tap 306. For example, when the lock release pattern is defined by positions at which four taps are sensed and time intervals between the taps, the controller 180 can decide that the fourth tap 306 is a tap finally applied to release the lock state of the mobile terminal 100. In this instance, any additional tap is not applied after the fourth tap 306, and therefore, there may be no time interval between the fourth tap 306 and the additional tap.

As shown in FIG. 3A(a) to FIG. 3A(d), when a plurality of taps are applied to release the lock state of the mobile terminal 100, the user can identify the plurality of graphic objects 310, 312, 314 and 316 of which sizes are determined by the time intervals between the plurality of taps. Thus, FIG. 3A(a) to FIG. 3A(d) describe examples that the graphic objects respectively corresponding to the time intervals between the taps are displayed on the display unit 151. However, the time intervals may be displayed to the user in another manner. For example, the controller 180 can display the time intervals using intensities of light of the LED provided in the main body of the mobile terminal 100 and/or on/off times of the LED. In this instance, the LED is flickered at on/off times determined according to the time intervals, so that the time intervals between the taps can be displayed to the user.

Similarly, the controller 180 can display the time intervals between the plurality of taps using the haptic module 153. In this instance, the haptic module 153 allows strengths and/or intensities of vibration to be different from each other based on the time intervals between the plurality of taps, so that the time intervals can be display to the user.

Meanwhile, the time intervals described above may be times when the state in which the taps are applied is maintained. If the first tap 300 is sensed, the controller 180 can display, on the display unit 151, the first graphic object 310 corresponding to the first tap 300, and determine the size of the first graphic object 310 based on a time when the first tap 300 is held. That is, the controller 180 extends the size of the first graphic object 310 when the first tap 300 is being held, and stops the extension of the size of the first graphic object 310 when the state in which the first tap 300 is held is finished.

Accordingly, the user can recognize the time when the first tap 300 is held based on the size of the first graphic object 310. In a similar manner, the controller 180 can determine the sizes of the second and third graphic objects 312 and 314. The size of the fourth graphic object 316 corresponding to the fourth tap 306, as described above, may be immediately determined at the same time when the fourth tap 306 is sensed. Accordingly, the fourth graphic object 316 may be displayed as shown in FIG. 3A (d). However, if the user holds the state in which the fourth tap 306 is applied, the size of the fourth graphic object 316 may also be determined based on a time when the fourth tap 306 is held.

Further, FIG. 3A(a) to FIG. 3A(d) describe examples that the sizes of the graphic objects 310, 312, 314 and 316 are extended in the longitudinal direction has been described as an example, but the sizes of the graphic objects 310, 312, 314 and 316 may be changed in another manner. For example, the sizes of the graphic objects 310, 312, 314 and 316 may be extended in the longitudinal direction and/or the lateral direction. Also, FIG. 3A(a) to FIG. 3A(d) describe an example that the graphic objects 310, 312, 314 and 316 are displayed in a line in the lateral direction based on the input order of the plurality of taps. However, this is merely one embodiment, and the present invention is not limited thereto. That is, the graphic objects 310, 312, 314 and 316 may have various sizes or shapes. The graphic objects 310, 312, 314 and 316 may also display in various manners.

Meanwhile, FIG. 3A(a) to FIG. 3A(d) described that a plurality of taps are applied from the user in a state in which the display unit 151 is non-activated, but the present invention may be applied even when the display unit 151 is not non-activated. That is, the present invention may also be applied when the user applies a touch pattern for controlling a specific function of the mobile terminal 100 when the display unit is activated. In this instance, the controller 180 can sense positions at which a plurality of taps applied from the user are sensed and time intervals between the taps, and allow the specific function of the mobile terminal 100 to be executed based on a touch pattern corresponding to the sensed result.

Also, FIG. 3A(a) to FIG. 3A(d) describe that information on time intervals between a plurality of tabs is displayed using graphic objects, vibration or light of the LED, but the information on the time intervals may not be displayed. In this instance, the controller 180 can compare positions at which a plurality of taps applied from the user and time intervals between the taps with a predetermined lock release pattern, and display different error messages when the sensed positions are different from the predefined lock release pattern and when the sensed time intervals are different from the predefined lock release pattern.

For example, when the positions at which the plurality of taps are sensed do not correspond to a predefined touch pattern, the controller 180 can display an error message for notifying this fact. Alternatively, when the positions at which the plurality of taps are sensed correspond to the predefined touch pattern, but the time intervals between the taps are different from the predefined touch pattern, the controller 180 can display an error message for notifying that the time intervals between the taps, i.e., a rhythm where the taps are input is wrong. In this instance, the controller 180 can provide the user with hint information on the rhythm.

Figure 3B:
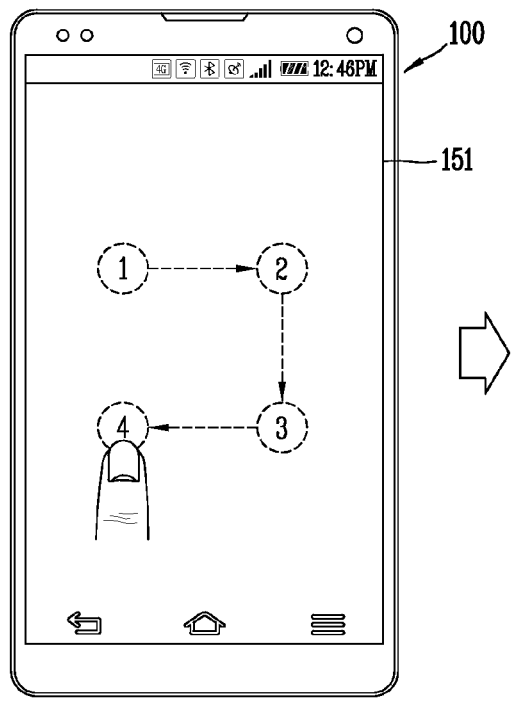
FIG. 3B(a) to FIG. 3B(c) are views illustrating examples of screens displayed when the user inputs a wrong touch pattern in the mobile terminal according to an embodiment.
Figure 3B:
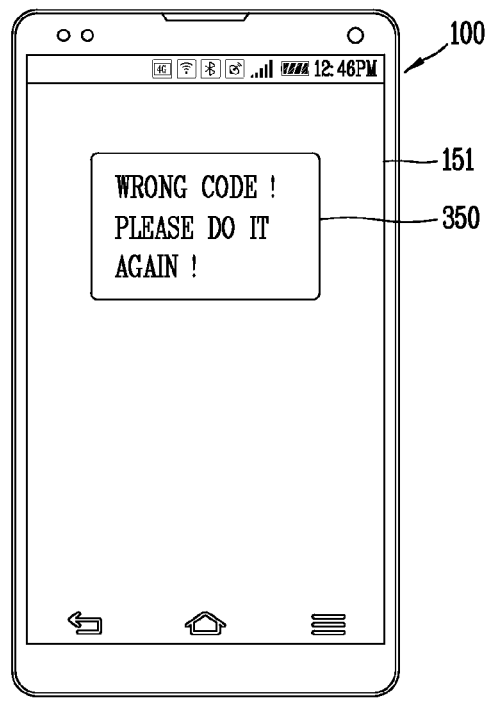
Figure 3B:
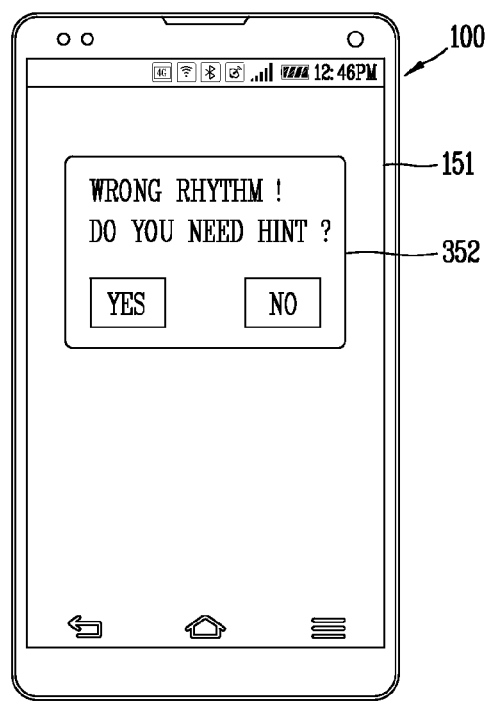

Next, FIG. 3B(a) to FIG. 3B(c) are views illustrating examples of screens displayed as described above in the mobile terminal according to an embodiment. First, referring to FIG. 3B (a), an example is illustrated in which the user sequentially applies a plurality of taps. In this instance, the controller 180 cannot display any mark as shown in FIG. 3B (a), but the controller 180, as shown in FIG. 3A, may display time intervals between the taps using graphic objects previous set whenever the plurality of taps are sequentially input.

Meanwhile, as shown in FIG. 3B (a), if a plurality of taps are applied, the controller 180 can first compare points at the plurality of taps are applied with a predefined lock release pattern. Then, the controller 180 can allow an error message to be displayed based on the comparison result. FIG. 3B (b) illustrates such an example. As shown in FIG. 3B (b), when the points at which the plurality of taps are applied do not correspond to the predefined lock release pattern as the comparison result, the controller 180 can display, on the display unit 151, image information 350 for notifying the user of this fact. In this instance, information for notifying that the user has wrongly input a code may be displayed in the image information 350 as shown in FIG. 3B (b). Here, the code may be determined by positions at which the plurality of taps are applied.

Further, when the points at which the plurality of taps are applied correspond to the predefined lock release pattern, the controller 180 can decide whether the time intervals between the plurality of taps respectively correspond to those between taps included in the predefined lock release pattern. This is because, as described above, the lock release pattern used in the mobile terminal 100 according to the embodiment is defined by not only positions at which a plurality of taps are applied but also time intervals between the taps.

Accordingly, the controller 180 can allow the lock state of the mobile terminal 100 to be released only when the time intervals between the taps correspond to the predefined lock release pattern even though the positions of the taps correspond to the lock release pattern. The controller 180 can notify, through image information, the user whether the user applies taps according to a right rhythm. FIG. 3B (c) illustrates such an example.

Referring to FIG. 3B (c), the image information 352 includes contents that the user has wrongly input a rhythm where a plurality of taps are applied. In this instance, the controller 180 can allow the user to select, through the image information 352, the providing of hint information related to the rhythm where the plurality of taps are applied.

That is, the user can selectively receive hint information related to the rhythm where the plurality of taps are applied through the image information 352 as shown in FIG. 3B (c). In this instance, hint information may be provided in various forms including a previously set sound source data file, vibration, light emitted from the LED, various forms of image information displayed on the display unit 151, and the like.

Also, if the user selects the providing of hint information in FIG. 3B (c), the controller 180 can select a manner that the hint information is provided, based on a predetermined hint information providing setting. Here, the manner that the hint information is provided may be determined based on the kind of hint information previously selected by the user. For example, if the hint information previously selected by the user is previously selected sound source data, the controller 180 can reproduce the sound source data as the hint information. Alternatively, if the previously selected hint information is a specific vibration pattern or a light pattern emitted from the LED, the controller 180 can the vibration pattern or the light pattern to be output.

Figure 4A:
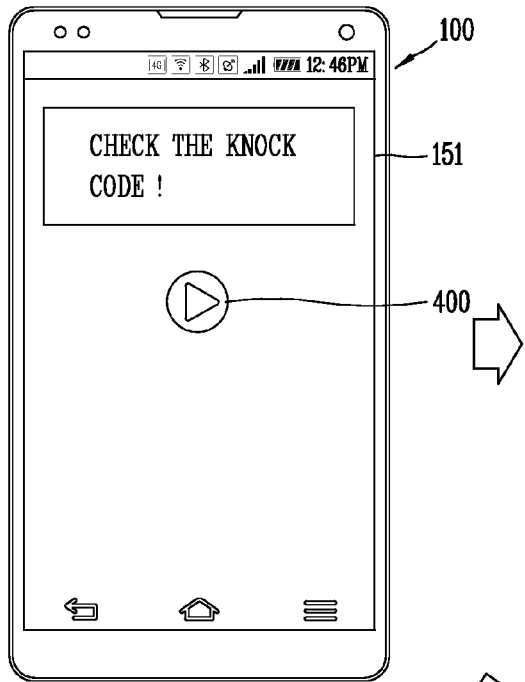
FIG. 4A(a) to FIGS. 4A(c) and 4B(a) to FIG. 4B(c) are views illustrating examples in which hint information is displayed when the user inputs a wrong touch pattern in the mobile terminal according to an embodiment.
Figure 4A:
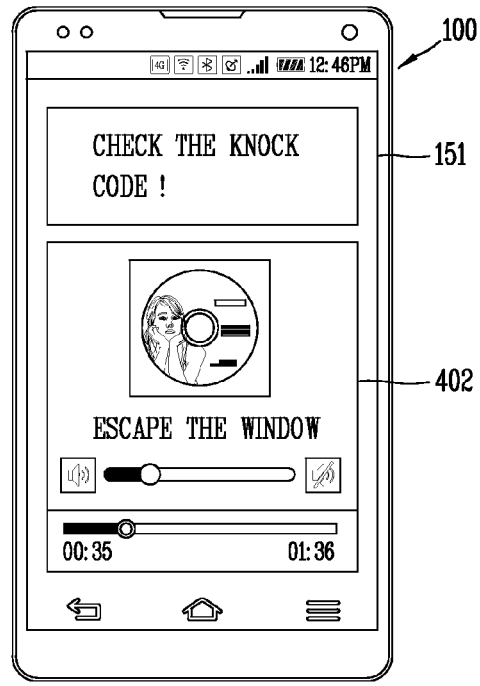
Figure 4A:
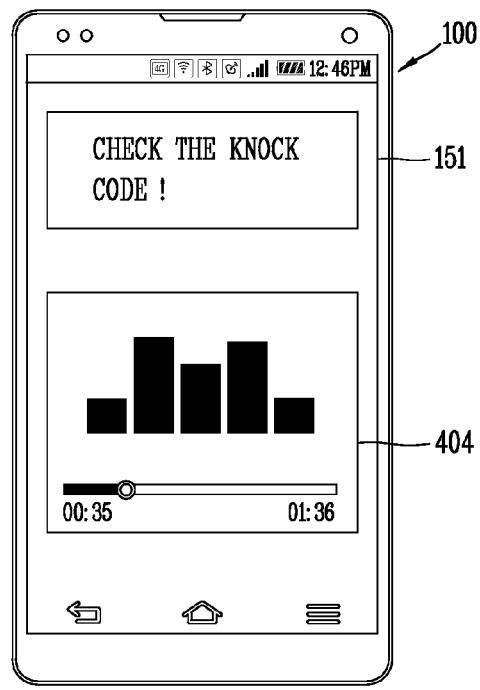
Figure 4B:
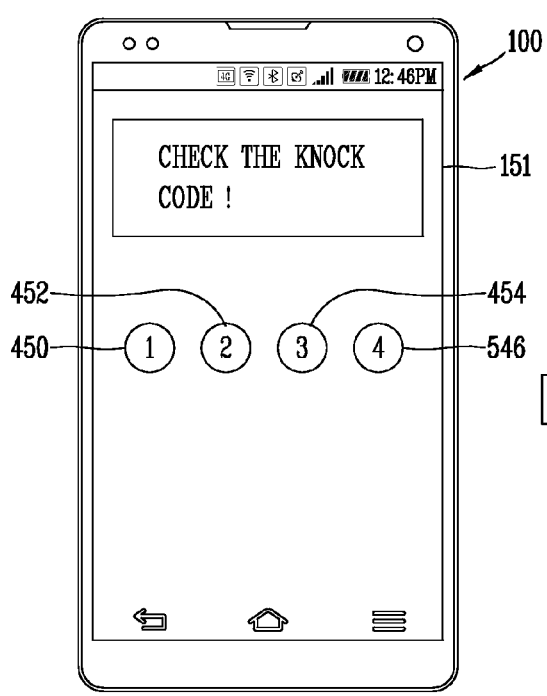
Figure 4B:
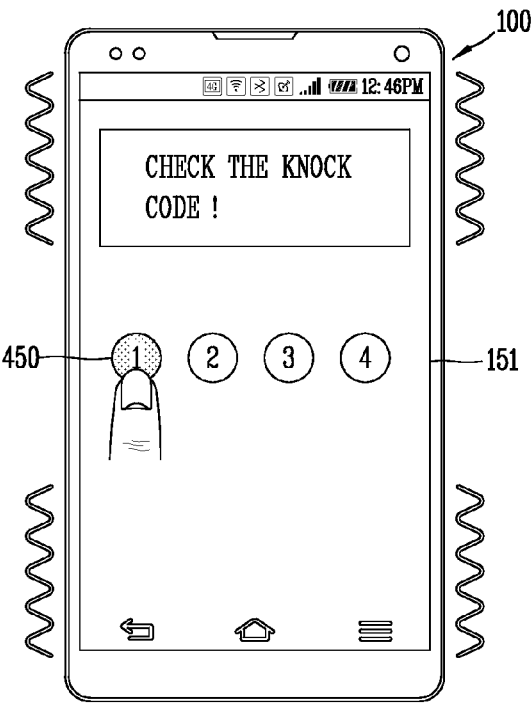
Figure 4B:
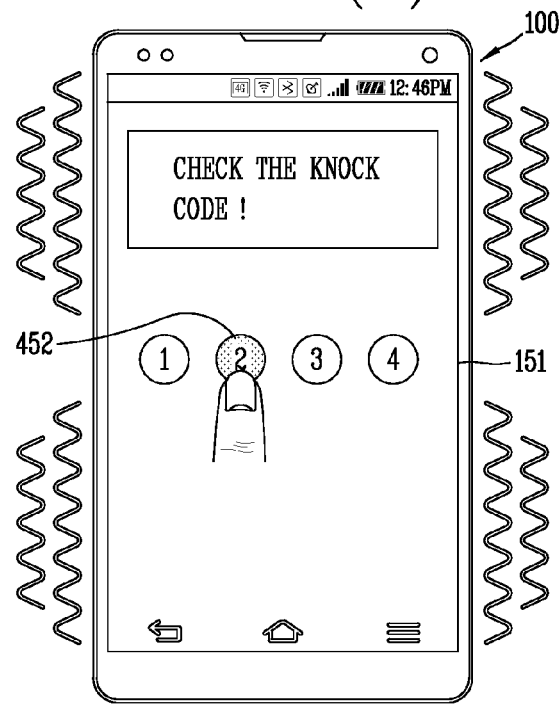

Next, FIG. 4A(a) to FIG. 4A(c) and FIG. 4B(a) to FIG. 4B(c) are views illustrating examples in which the hint information is displayed in the mobile terminal according to an embodiment. First, referring to FIGS. 4A(a) to 4A(c), examples are illustrated in which predetermined sound source data are output as the hint information. Therefore, if the user selects the providing of the hint information in FIG. 3A (b), the controller 180 can display, on the display unit 151, a graphic object 400 that enables sound source data to be reproduced as shown in FIG. 4A (a), and allow sound source data previously set as hint information based on a user's selection with respect to the graphic object 400.

In this instance, the sound source data set as the hint information may be displayed in various forms. For example, as shown in FIG. 4A (b), the sound source data may be output in the form where general sound source data are reproduced. In this instance, image information 402 including information on the title, reproduction time and the like of the reproduced sound source data may be displayed on the display unit 151.

Alternatively, the controller 180 can reproduce the sound source data, and simultaneously, as shown in FIG. 4A (c), may display, on the display unit 151, sound pattern information 404 obtained by visualizing a bit spectrum corresponding to the sound source data. In this instance, the visualized sound pattern information is obtained by visualizing the rhythm of the sound source data set as the hint information, and thus the user can identify the hint information not only auditorily but also visually.

Meanwhile, as described above, the hint information may be provided through a vibration pattern. For example, the hint information may be a vibration pattern composed of different vibration times or vibration intensities according to the time intervals between the taps. In this instance, when the user selects the providing of the hint information, the controller 180 can output vibration according to the predetermined vibration pattern.

Alternatively, the controller 180 can allow the user to select and identify time intervals corresponding to the respective taps. FIG. 4B illustrates such an example. If the user selects the providing of the hint information in FIG. 3B (c) when the hint information is the predetermined vibration pattern, a screen as shown in FIG. 4B (a) may be displayed on the display unit 151.

Referring to FIG. 4B (a), user-selectable graphic objects 450, 452, 454 and 456 can be displayed on the display unit 151. Here, the graphic objects 450, 452, 454 and 456 may respectively correspond to the taps included in the predetermined lock release pattern. When the user selects any one graphic object, the controller 180 can output, through vibration, information on a time interval of a tap corresponding to the graphic object selected by the user. For example, the controller 180 can output the information through a time for which the vibration is continued or a strength with which the vibration is output.

For example, as shown in FIG. 4B (b), if the user selects any one graphic object (first graphic object 450), the controller 180 can control the haptic module 153 so that the vibration is output according to a time interval corresponding to a tap (first tap) corresponding to the first graphic object 450. Here, the time interval corresponding to the first tap may be a time interval until a second tap is applied after the first tap is applied or a time the first tap is applied is maintained.

In this state, as shown in FIG. 4B (c), if the user selects another graphic object (second graphic object 452), the controller 180 can output the vibration according to a time interval corresponding to a tap (second tap) corresponding to the second graphic object 452. Here, the intensity or continuous time of the vibration according to the time interval corresponding to the second tap may be different from that of the vibration according to the time interval corresponding to the first tap.

This is because the vibration is determined according to the time intervals corresponding to the respective first and second taps, and therefore, the intensities or continuous times of the vibration may be different when the time intervals are different from each other. In such a manner, the controller 180 can output, through the vibration, hint information on time intervals respectively corresponding to the plurality of taps.

Meanwhile, similarly, light emitted from the LED may be used as well as the vibration. For example, the controller 180, as shown in FIG. 4B (a), may display the plurality of graphic objects 450, 452, 454 and 456 on the display unit 151. If any one of the graphic objects is selected, the controller 180 can allow the LED to emit light based on a time interval of a tap corresponding to the selected graphic object among the taps included in the predefined lock release pattern. Here, the emission intensities or emission times of the LED may be different from each other according to time intervals of the taps included in the predefined lock release pattern.

Accordingly, the user can identify, through an emission state of the LED, time intervals between the taps included in the predefined lock release pattern, i.e., a rhythm where the plurality of taps are applied. In addition, the controller 180 can decide whether the user applies a right touch pattern based on not only the positions at which the taps are applied but also the rhythm where the taps are applied, i.e., the time intervals between the taps. Accordingly, in the present invention, when the user sets a touch pattern, the user can identify the time intervals between the taps.

Figure 5A:
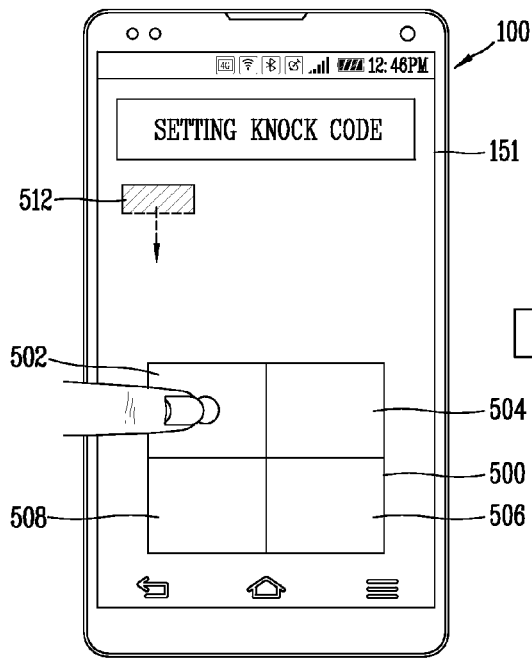
FIG. 5A(a) to FIG. 5A(d), FIG. 5B(a) to FIG. 5B(d), FIG. 5C(a) to FIG. 5C(d), FIG. 5D(a) to FIG. 5D(d), and FIG. 5E(a) to FIG. 5E(d) are views illustrating examples in which touch patterns are set by the user in the mobile terminal according to an embodiment.
Figure 5A:
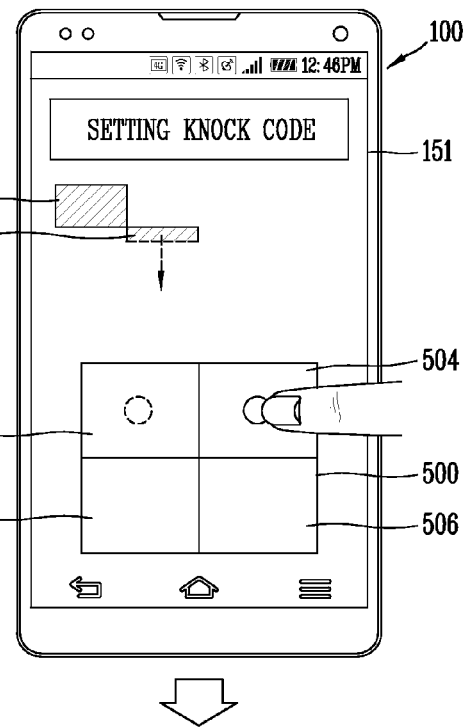
Figure 5A:
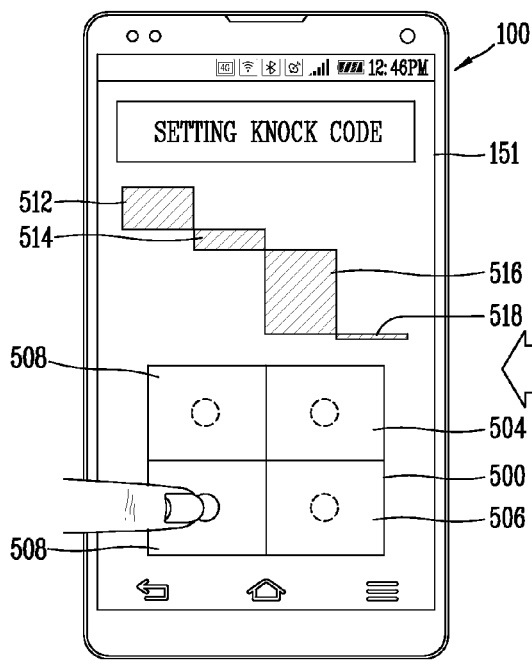
Figure 5A:
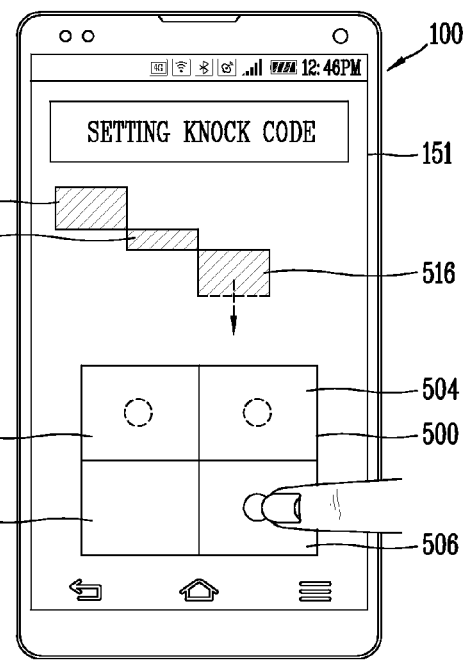

Next, FIGS. 5A to 5E are views illustrating examples in which touch patterns are set by the user in the mobile terminal according to an embodiment. For example, the controller 180, as shown in FIG. 5A(a) to FIG. 5A(d), may divide one area 500 on the display unit 151 into a predetermined number of areas, and determine positions of taps included in a lock release pattern based on taps sensed in the respective divided areas. Here, the one area 500 may be determined according to the number of taps included in a touch pattern defined by the user. That is, when the user allows a lock release pattern to be formed with four taps, the one area 500 may be divided into four areas as shown in FIG. 5A. When the number of divided areas is more or less, the one area may be divided into a larger or smaller number of areas.

The controller 180 can sense positions of the taps and time intervals between the taps, and define a lock release pattern formed with the positions of the taps and the time intervals between the taps. Thus, if a user's touch input is sensed among areas 502, 504, 506 and 508 of the one area 500, the controller 180 can check a time that elapses until the user's touch input is sensed, and display the checked time to the user in various forms.

For example, the controller 180 can display the checked time using various forms of graphic objects. The size or shape (e.g., the length) of the graphic object, as shown in FIGS. 3A(a) to 3A(d), may be determined based on each time interval.

FIGS. 5A and 5B illustrate such examples. Hereinafter, for convenience of illustration, the user sequentially touching points of a first area 502, a second area 504, a third area 506 and a fourth area 508 in order to set a lock release pattern will be described as an example. However, this is merely an example, and the present invention is not limited thereto.

First, referring to FIG. 5A (a), if the user applies a first touch input (first tap) to any one (the first area 502) among the divided areas 502, 504, 506 and 508, the controller 180 can display a first graphic object 512 corresponding to the first tap. The controller 180 can allow the size of the first graphic object 512 to increase until the user applies a second touch input (second tap) to another area (the second area 504).

Also, if the second tap is applied to the second area 504, the controller 180 can stop increasing the size of the first graphic object 512. The controller 180 can display a second graphic object 514 near the first graphic object 512 based on the applied second tap. Accordingly, FIG. 5A (b) illustrates such an example.

Further, the size of the second graphic object 514 may gradually increase until still another touch input (third tap) is applied to the third area 506 after the second tap is applied. If the third tap is applied, the controller 180 can stop increasing the size of the second graphic object 514 in response to the third tap, and display, on the display unit 151, a graphic object (third graphic object 516) corresponding to the third tap. In this instance, like the graphic objects 512 and 514, the size of the third graphic object 516 may increase until a next tap is applied.

Meanwhile, as described above, when a lock release pattern is formed with consecutive four taps, the fourth tap applied after the third tap is applied may be the last tap included in the lock release pattern. In this instance, if the fourth tap is applied to the fourth area 508, the controller 180 can stop increasing the size of the third graphic object 516, and may display, on the display unit 151, a fourth graphic object 518 corresponding to the fourth tap.

FIG. 5A(a) to FIG. 5A(d) describes that the user recognizes the time intervals applied to the respective taps using the graphic objects of which sizes are changed, but the graphic objects may be displayed in different forms based on the time intervals between the taps. For example, the graphic objects may be displayed in the form of a bar or a segment. In this instance, the time intervals may be displayed in the form where the length of the bar or segment is changed. FIG. 5B(a) to FIG. 5B(d) illustrate such examples.

Referring to FIG. 5B(a) to FIG. 5B(d), when a first tap is sensed in the first area 502, the controller 180 can display, on the display unit 151, a graphic object 522 corresponding to the first tap. When a second tap is sensed, the controller 180 can display a second graphic object 524 corresponding to the second tap at a distance determined according to a time interval where the first and second taps are sensed. The controller 180 can display, on the display unit 151, a bar-shaped graphic object that connects between the first and second graphic objects 522 and 524. Accordingly, the user can recognize the time interval until the second tap is applied after the first tap is applied based on the graphic object that connects between the first and second graphic objects 522 and 524.

When third and fourth taps are sensed in such a manner, the controller 180 can display graphic objects 526 and 528 corresponding to the respective taps at distances corresponding to time intervals between the respective taps, and display a graphic object that connects between the graphic objects. FIGS. 5B (c) and (d) illustrate such an example.

Meanwhile, if a predetermined number of taps are sensed, the controller 180, as shown in FIG. 5B (d), can visually display, on the display unit 151, the time intervals between all the taps with respect to the lock release pattern. Accordingly, the user can visually identify the time intervals between the taps.

Further, when time intervals between taps are displayed as described above, the time intervals may be changed depending on a user's selection. For example, when the graphic objects are respectively displayed at distances determined based on the time intervals between the taps as shown in FIG. 5B (d), the user may move the graphic objects by touching and dragging the positions of the graphic objects. In this instance, the position of each graphic object corresponding to a user's touch input may be moved, and accordingly, the time intervals between the corresponding taps can be adjusted.

That is, for example, when the user moves the second graphic object 524 in the direction where the first graphic object 522 is positioned by touching and dragging the second graphic object 524, the time interval between the first and second taps can be reduced. Further, the time interval between the second and third taps can be increased as much as the reduced time interval between the first and second taps.

In addition, the sizes or lengths of the graphic objects (512, 514, 516 and 518 or 522, 524, 526 and 528) may be determined based on times when the first, second, third and fourth taps are applied to the display unit 151, i.e., a time for which the user holds a touch input. That is, as described above, if the time intervals between the taps means times for which the taps are maintained, the controller 180 can sense times for which the states in which the first to fourth taps are applied to the areas 502, 504, 506 and 508, and determine the sizes of the graphic objects corresponding to the respective first to fourth taps. In this instance, the times for which the taps are held may be time intervals between the taps.

Further, the rhythm where the taps of the lock release pattern are applied may further reflect not only the time intervals between the taps but also the times for which the states in which the taps are held are maintained. For example, if the user holds the state in which the first tap is applied for 0.1 second and then applies the second tap after 0.2 second elapses, when the user sets the lock release pattern, the time (0.1 second) for which the first tap is held and the time interval (0.2 second) until the second tap is sensed after the first tap is applied may be a rhythm where the taps are applied in the lock release pattern.

Figure 5C:
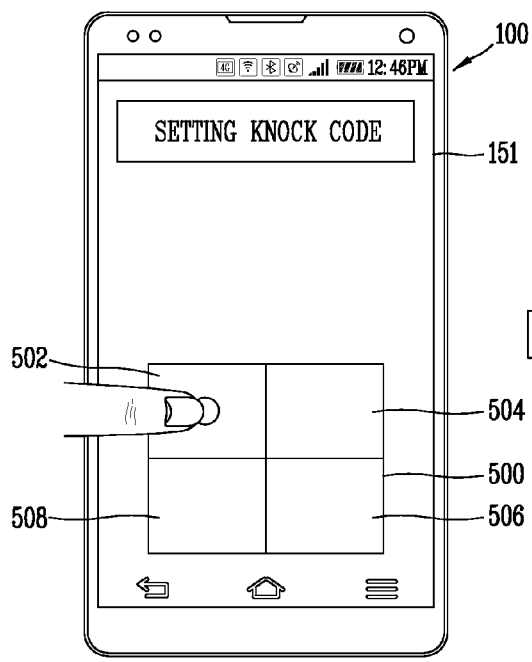
Figure 5C:
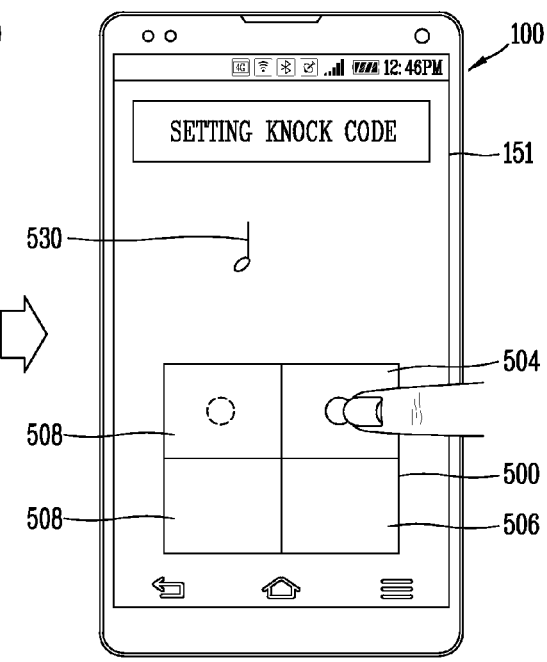
Figure 5C:
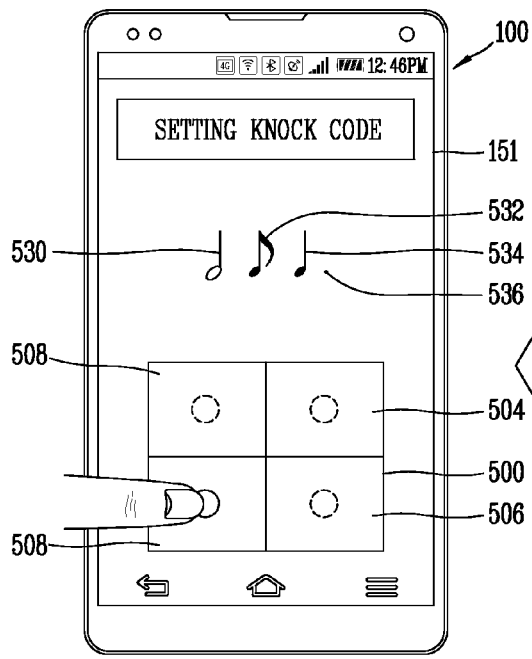
Figure 5C:
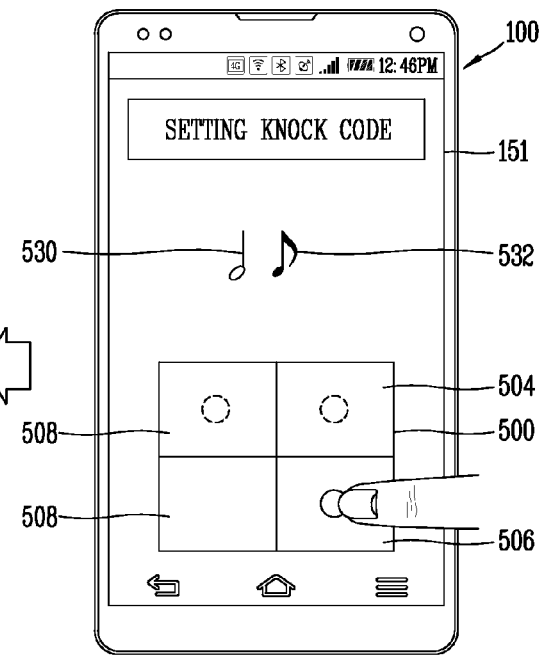

Also, the time intervals described above may be displayed in another form. For example, the controller 180 can display the time intervals between the taps in the form of musical notes based on beats determined according to the time intervals between the taps. For example, as shown in FIG. 5C (a), when the user applies a second tap after the user applies a first tap, the controller 180 can check a time interval until the second tap is sensed after the first tap is sensed, and determine a beat length corresponding to the checked time interval. The controller 180 can display, on the display unit 151, a musical note-shaped graphic object 530 corresponding to the determined beat length. FIG. 5C (b) illustrates such an example.

In a similar manner, when third and fourth taps are sensed, the controller 180 can determine beat lengths according to the time intervals between the taps, and display, on the display unit 151, musical note-shaped graphic objects 532 and 534 respectively corresponding to the determined beat lengths. As shown in FIGS. 5C (c) and (d), the musical note-shaped graphic objects respectively corresponding to the time intervals between the taps may be displayed on the display unit 151. In this instance, a graphic object 536 corresponding to the last tap may be displayed as a period-shaped graphic object in order to indicate that the graphic object 536 corresponds to the last tap. This is because, in the case of the last tap included in the lock release pattern as described above, it is unnecessary to consider time intervals between taps applied next time.

Figure 5D:
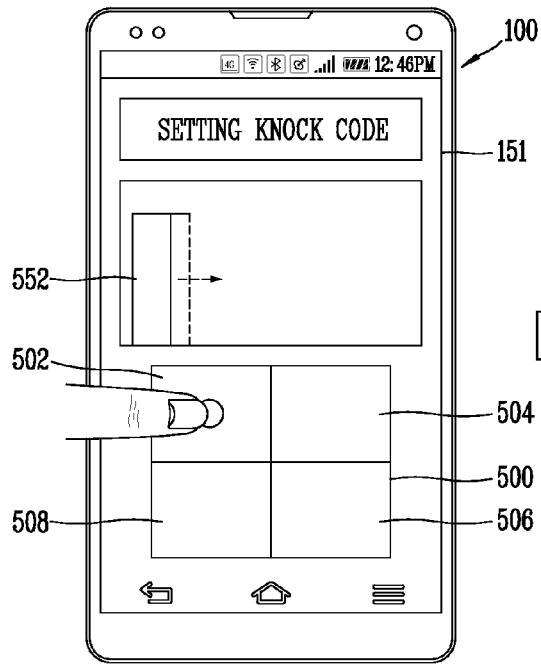
Figure 5D:
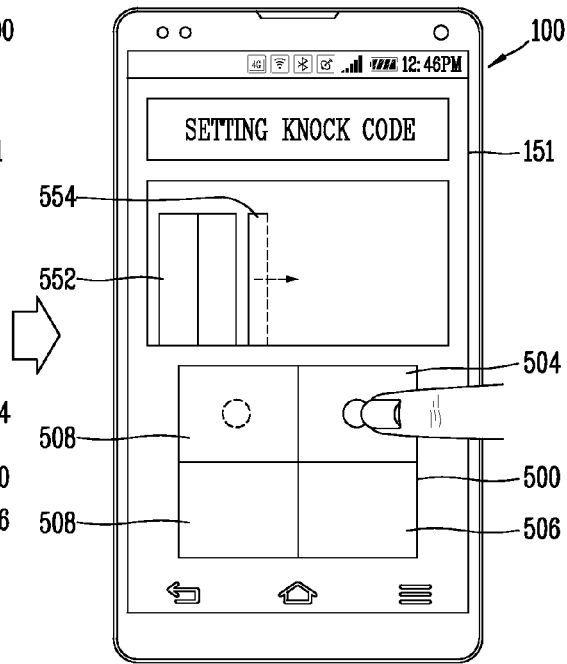
Figure 5D:
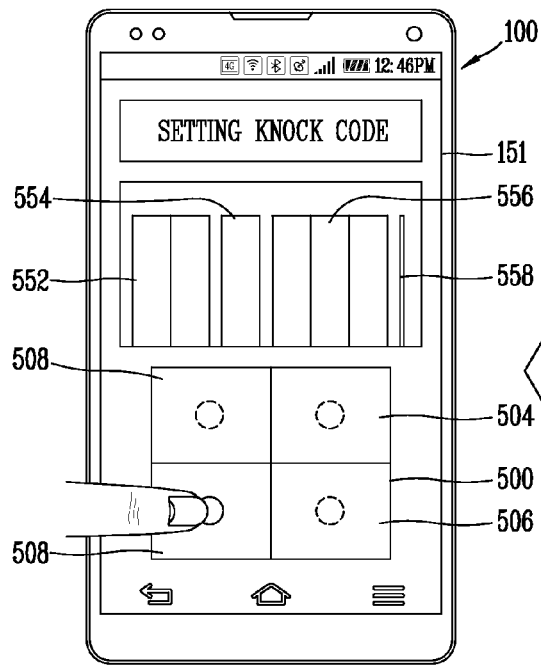
Figure 5D:
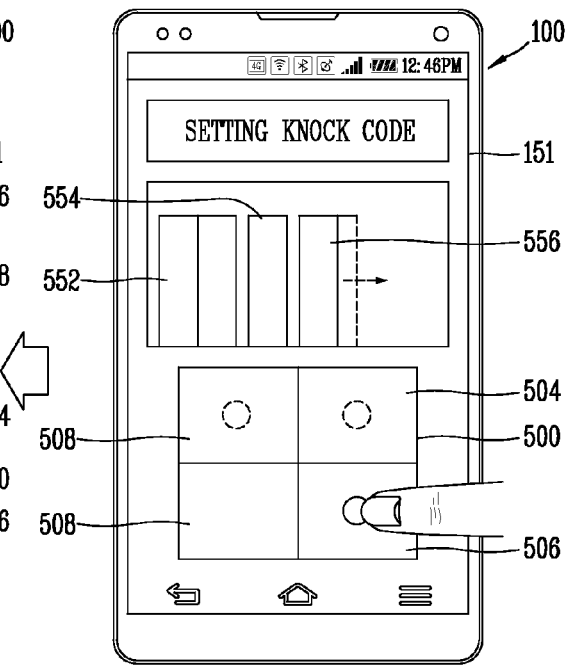

Further, the time intervals between the taps may be displayed in the form of a bit spectrum. FIG. 5D(a) to FIG. 5D(d) illustrate examples in which the time intervals between the taps are displayed in the form of a bit spectrum. First, referring to FIG. 5D (a), when a first tap is sensed, the controller 180 can display, on the display unit 151, a bit spectrum based on a time interval until a second tap is sensed after the first tap is sensed. Here, the bit spectrum may be configured with a plurality of bar-shaped graphic objects, and the bar-shaped graphic objects may respectively correspond to predetermined times.

Therefore, until the second tap is sensed, the controller 180 can generate the bar-shaped graphic objects of the bit spectrum and display them on the display unit 151. When the second tap is sensed, the controller 180 can stop the generation of bit spectrum objects 552 corresponding to the first tap, and display a bit spectrum object 554 corresponding to the second tap. In this instance, as shown in FIG. 5D (b), the bit spectrum object 554 corresponding to the second tap may be displayed on the display unit 151.

As shown in FIG. 5D(c), if a third tap is applied, the controller 180 can stop displaying the bit spectrum object 554 corresponding to the second tap, and display bit spectrum objects 556 corresponding to the third tap. As shown in FIG. 5D (d), the controller 180 can display, on the display unit 151, bar-shaped graphic objects corresponding to the time interval until a fourth tap is sensed.

Meanwhile, in the above description, when the user defines a lock release pattern using image information displayed on the display unit 151, time intervals between taps included in the lock release pattern are displayed has been illustrated as an example. However, the time intervals may be displayed using a vibration or emission state of the LED, as well as the image information. In this instance, the time intervals may be displayed according to intensities or lengths of the vibration or intensities or emission times of light from the LED.

Also, in the above description, when a touch input is sensed at any one point within the same time or times that can be decided as the same time has been illustrated as an example. However, alternatively, when a plurality of touch inputs are sensed at a plurality of points within the same time or times that can be decided as the same time, the plurality of touch inputs may be decided as one tap. In this instance, when the points at which the plurality of touch inputs are sensed are changed, the controller 180 can decide that different taps are sensed.

Figure 5E:
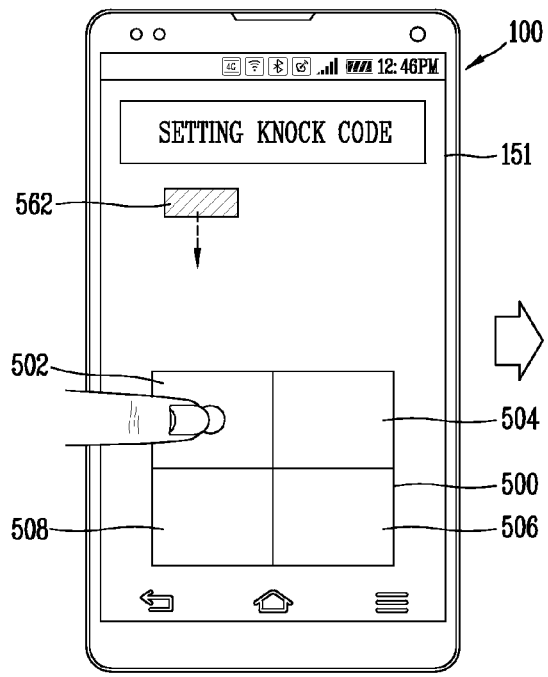
Figure 5E:
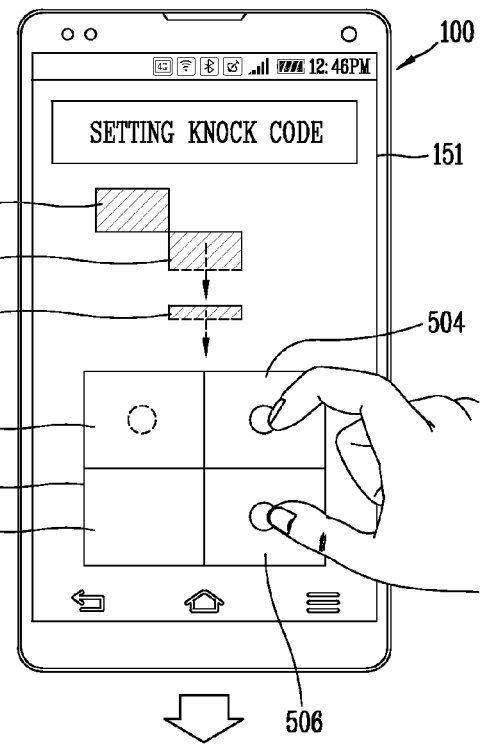
Figure 5E:
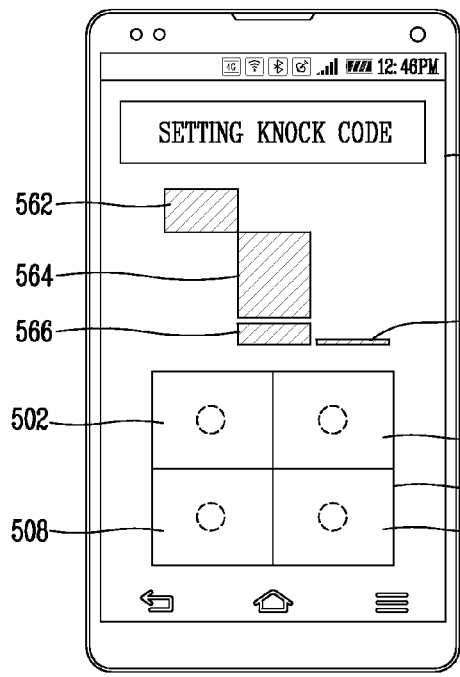
Figure 5E:
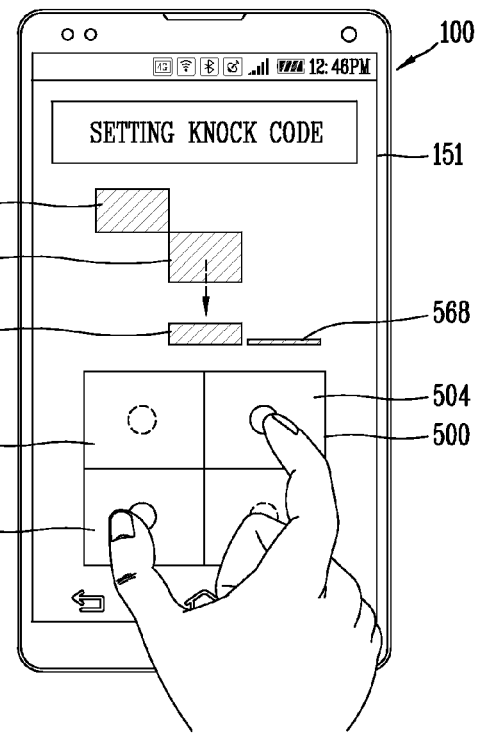

In FIG. 5E(a) to FIG. 5E(d), when a plurality of touch inputs are sensed, this is considered as one tap. For convenience of illustration, in the description of FIG. 5E(a) to FIG. 5E(d), the number of predetermined taps being three will be illustrated as an example. However, the present invention is not limited thereto, and a larger or smaller number of taps may be defined as a lock release pattern.

Referring to FIG. 5E(a), when the user applies a first tap, a graphic object (first graphic object 562) corresponding to the first tap is displayed on the display unit 151. In this instance, the size of the first graphic object 562 increases until a next tap is sensed. In this state, when the user simultaneously applies touch inputs to the second and third areas 504 and 506, the controller 180 decides that the touch inputs are applied within the same time or times that can be decided as the same time. Then, the plurality touch inputs may be considered as one tap (second tap). In this instance, as shown in FIG. 5E (b), graphic objects (a second graphic object 564 and a third graphic object 566) corresponding to the second tap may be displayed on the display unit 151.

Further, in this state, the sizes of the graphic objects 564 and 566 may increase until a next tap is sensed. Here, the sizes of the graphic objects may be determined based on time for which the corresponding touch inputs are held, respectively. That is, as shown in FIG. 5E (b), when the user applies the touch inputs to the respective second and third areas 504 and 506, the touch input is applied to the second area 504 is maintained. When a new touch input is applied to the fourth area 508 in place of the third area 506, the controller 180 can consider that a new tap is sensed. This is because, when the points at which a plurality of touch inputs are sensed are changed, it may be decided that different taps are sensed.

In this instance, the controller 180 can determine the sizes of the graphic objects 564 and 566 by reflecting this fact. That is, although another tap is sensed, the touch input applied to the second area 504 is maintained as it is. Therefore, the controller 180 continuously increases the size of the second graphic object 564 corresponding to the touch input applied to the second area 504. However, the touch input applied to the third area 506 is in a state in which any touch input is not applied, and therefore, the controller 180 can stop increasing the size of the third graphic object 566. Accordingly, as shown in FIG. 5E (c), when the size of the second graphic object 564 continuously increases, but the increase in the size of the third graphic object 566 is stopped can be displayed on the display unit 151.

Further, when the number of taps defined in the lock release pattern is three as described above, the controller 180 can consider, as the last tap, a case where touch inputs are applied to the second and fourth areas 504 and 508. In this instance, the controller 180, as shown in FIG. 5E (d), can display, on the display unit 151, a fourth graphic object 568 corresponding to the third tap. Here, the size of the fourth graphic object 568 may be determined based on a time for which the touch input applied to the fourth area 508 is continued.

When any touch input is not sensed in the second and fourth areas 504 and 508, the controller 180 can decide that the user has completed the input of the third tap. Accordingly, the controller 180 can determine the sizes of the second and fourth graphic objects 564 and 568 by stopping that the sizes of the second and fourth graphic objects 564 and 568 increase. FIG. 5E (d) illustrates such an example.

In the above description, examples of the lock release pattern for releasing the lock state of the mobile terminal have been illustrated. However, this is merely an embodiment, and the present invention is not limited thereto. That is, the present invention may be applied to a touch pattern for controlling another function of the mobile terminal. The mobile terminal and the method for controlling the same according to the present invention have advantages as follows.

According to embodiments of the present invention, when a plurality of taps are applied to the main body of the mobile terminal in order to control a function of the mobile terminal, the lock state of the mobile terminal is released based on a touch pattern formed according to positions at which the taps are sensed and time intervals between the taps, thereby providing a more powerful security function.

Further, according to embodiments of the present invention, a touch pattern has a predetermined rhythm, so that when a plurality of taps are applied to the main body of the mobile terminal according to the touch pattern, the user can feel interested.

The foregoing embodiments and advantages are merely and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a wireless communication unit configured to provide wireless communication;
   a touch screen; and
   a controller configured to:
   enter the mobile terminal into a lock state,
   receive a first tap applied on the touch screen of the mobile terminal which is in the lock state,
   display, on the touch screen of the mobile terminal which is in the lock state representing the first tap, a first graphic object having at least one of a size and length changed based on a time during which the first tap applied is maintained,
   receive a second tap applied on the touch screen of the mobile terminal which is in the lock state,
   display, on the touch screen of the mobile terminal which is in the lock state representing the second tap, a second graphic object having at least one of a size and length changed based on a time during which the second tap applied is maintained while displaying the first graphic object, and
   release the lock state of the mobile terminal when a touch pattern formed by a plurality of taps including the first tap and second tap matches defined positions of the plurality of taps and times of the plurality of taps applied on the touch screen of the mobile terminal which is in the lock state are maintained.

2. The mobile terminal of claim 1, wherein the controller is further configured to output vibrations with different intensities or at different times based on the times of the plurality of taps applied on the touch screen.

3. The mobile terminal of claim 1, wherein the controller is further configured to output lights with different brightness or at different times using a light emitting diode (LED) of the mobile terminal based on the times of the plurality of taps applied on the touch screen.

4. The mobile terminal of claim 1, wherein the controller is further configured to output different error messages based on incorrect positions of the taps being input and incorrect times of the plurality of taps applied on the touch screen.

5. The mobile terminal of claim 4, wherein the error message includes a user-selectable graphic item for providing hint information related to the times of the plurality of taps applied on the touch screen.

6. The mobile terminal of claim 5, wherein the controller is further configured to output predetermined sound source data as the hint information in response a selection of the graphic item.

7. The mobile terminal of claim 6, wherein the controller is further configured to display a bit spectrum related to the sound source data on the touch screen.

8. The mobile terminal of claim 5, wherein the controller is further configured to output vibration or LED light based on the times of the plurality of taps applied on the touch screen in response to a selection of the graphic item.

9. The mobile terminal of claim 5, wherein the controller is further configured to:
  display a plurality of graphic objects corresponding to respective taps on the touch screen, and
  output vibration or LED light based a time of a tap corresponding to a selected graphic object is applied on the touch screen.

10. The mobile terminal of claim 1, wherein the controller is further configured to:
  display a touch pattern setting window for setting the touch pattern to release the lock state, and
  display graphic objects representing times of the plurality of tap inputs for setting the touch pattern applied on the touch screen.

11. The mobile terminal of claim 10, wherein the controller is further configured to display sizes or shapes of the graphic objects to be different from each other based on the times of the plurality of taps applied on the touch screen.

12. The mobile terminal of claim 10, wherein the graphic objects are musical note-shaped graphic objects having beat lengths determined according to the time intervals between the taps times of the plurality of taps applied on the touch screen.

13. The mobile terminal of claim 10, wherein the controller is further configured to emit LED light having a brightness or emission times determined according to the times of the plurality of taps applied on the touch screen.

14. The mobile terminal of claim 10, wherein the controller is further configured to vibrate the mobile terminal having vibration intensities or vibration times determined according to the times of the plurality of taps applied on the touch screen.

15. The mobile terminal of claim 10, wherein when at least first and second tap inputs are simultaneously input on the touch pattern setting window, the controller is further configured to:
  set the first and second tap inputs as one tap among the plurality of taps in the touch pattern, and
  display graphic objects respectively corresponding to the first and second tap inputs based on times of the first and second tap inputs are applied on the touch screen.

16. The mobile terminal of claim 1, wherein the controller is further configured to execute any one of a plurality of functions executable in the mobile terminal based on any one of the plurality of touch patterns formed by the plurality of taps, and
  wherein the plurality of touch patterns has at least one of different positions at which the taps are sensed and different times of the taps applied on the touch screen.

17. A method of controlling a mobile terminal, the method comprising:
  entering, via a controller, the mobile terminal into a lock state;
  receiving a first tap applied on the touch screen of the mobile terminal which is in the lock state;
  displaying, on the touch screen of the mobile terminal which is in the lock state representing the first tap, a first graphic object having at least one of a size and length changed based on a time during which the first tap applied is maintained;
  receiving a second tap applied on the touch screen of the mobile terminal which is in the lock state;
  displaying, on the touch screen of the mobile terminal which is in the lock state representing the second tap, a second graphic object having at least one of a size and length changed based on a time during which the second tap applied is maintained while displaying the first graphic object; and
  releasing, via the controller, the lock state of the mobile terminal when a touch pattern forming by a plurality of taps including the first tap and second tap matches defined positions of the plurality of taps and times of the plurality of taps applied on the touch screen of the mobile terminal which is in the lock state are maintained.

* * * * *